May 3, 1960 H. A. PANISSIDI 2,935,046
HYDRAULIC CONTROL APPARATUS
Filed May 23, 1957 4 Sheets-Sheet 1

INVENTOR.
HUGO A. PANISSIDI
BY
Frank W. Lonvintzer
ATTORNEY

May 3, 1960 H. A. PANISSIDI 2,935,046
HYDRAULIC CONTROL APPARATUS
Filed May 23, 1957 4 Sheets-Sheet 2

INVENTOR.
HUGO A. PANISSIDI
BY
Frank W. Lownitzer
ATTORNEY

May 3, 1960  H. A. PANISSIDI  2,935,046
HYDRAULIC CONTROL APPARATUS
Filed May 23, 1957  4 Sheets-Sheet 3

INVENTOR.
HUGO A. PANISSIDI
BY
Frank W. Lominitzer
ATTORNEY

INVENTOR.
HUGO A. PANISSIDI
BY
Frank W. Lowritzer
ATTORNEY

United States Patent Office 2,935,046
Patented May 3, 1960

---

2,935,046

HYDRAULIC CONTROL APPARATUS

Hugo A. Panissidi, Binghamton, N.Y., assignor to International Business Machines Corporation, New York, N.Y., a corporation of New York Application May 23, 1957, Serial No. 661,112

9 Claims. (Cl. 121—38)

This invention relates generally to hydraulic control apparatus and more particularly to the type capable of selectively controlling the transmission of operating hydraulic pulses.

It is the main object of the present invention to provide improved means to control the selective transmission or conduction of the hydraulic operating pulses to a driver member.

A still further object of the invention is to also transmit hydraulic restoring impulses to said driver member to positively restore the latter.

More specifically it is also an object of the invention to control the selective transmission of said hydraulic operating pulses by opening a gate valve, and to effect the opening and closing of said gate valve by supplemental hydraulic pulses.

A still further object of the invention is to provide an improved form of said gate valve which is opened by a hydraulic pulse and restored to closed position by a restoring hydraulic pulse.

Another related object is to provide means to apply the pulses which open and close the gate valve alternately to opposite sides of the freely floating piston of the gate valve.

Another object is to provide electromagnetic means which is effective when the gate valve is to be opened for the transmission of the hydraulic operating pulse to momentarily retain and hold the piston of the gate valve against the force of the piston restoring hydraulic pulse whereby the gate valve is retained opened for a short duration.

More specifically it is an object of the invention to interpose a gate valve in a hydraulic pressure conduit system which is normally conditioned by a hydraulic pulse to open said system, and to provide means when it is desired to effect the transmission of an operating hydraulic pulse to retain said gate valve in an open position, and when it is not desired to effect the transmission of said operating hydraulic pulse to restore said gate valve back to a closed position by another hydraulic pulse.

In connection with the last feature of the invention, it is an object of the invention to employ hydraulic pulses to alternately shift said gate valve to either open or closed position, and to employ an electromagnet which, upon its energization, has sufficient force to retain the gate valve in open position against the force of the restoring hydraulic pulse which would normally close said gate valve when said electromagnet is not energized.

While the above features of the invention and others which will be visibly apparent as the improvement is understood, have general applications in the art of hydraulic apparatus, the present improvements have been found to be particularly useful in card punching machines in the attainment of higher punch operating speeds. The electromagnetic control of said gate valve is particularly useful and desirable since it enables the incorporation of the present hydraulic improvements in electric card punching machines without destroying the desirable feature of selectivity, i.e. the plug board control which enables card punching in selected card fields. Therefore, the present improvements may be advantageously embodied in a well known commercial form of card punching machine, especially in the attainment of higher card punch speeds and with a minimum of structural changes.

Accordingly, it is an object of the invention to design a hydraulic operating system for a card punch wherein reciprocating strokes of the card punch are effected by hydraulic pulses and at a speed greater than that now obtainable by mechanical operations.

A still further object is to provide a selective transmission of successive pulses to operating and restoring pistons for a punch operating member, one of which pulses restores said punch operating member and another of which pulses operates said punch operating member, and to provide a gate valve to control the selective transmission of said operating hydraulic pulses.

Another object is to provide an electromagnet to effect the opening and time of closing of said gate valve in the novel manner previously described, and to effect its energization selectively, in accordance with the requirement to punch a hole.

To more clearly understand the preferred construction of the present hydraulic apparatus when incorporated in a card punching machine, said hydraulic apparatus includes a conventional liquid reservoir with the customary appurtenances, such as fluid gear pump, filter, pressure regulator and accumulator which supplies liquid at a constant pressure from the pressure side of said gear pump to a differential valve unit. The differential valve unit generates hydraulic pulses and is the main source of hydraulic pulses for the punching mechanism. The pulses are timed under control of cams operating the valve unit synchronously with the card punching and feeding mechanisms. The hydraulic mechanism further includes dual pistons, the cylinders of which are connected to the output ports of the differential valve unit. Upon application of hydraulic pressure pulse from the differential valve unit one of the pistons powers the punch and upon application of a hydraulic restoring pulse from the same source the other piston serves to return the punch. The conduction of a hydraulic pressure pulse to each punch operating piston is normally blocked by a respective magnetically controlled gate valve. The gate valves are subject to hydraulic pulses which are generated by a supplemental valve unit to initially open the gate valves by moving the pistons from normal closed position to their open position at which time punch selecting electromagnets may be energized. The gate valves associated with energized magnets have their pistons retained momentarily in open position against the force of the restoring hydraulic pulse. The pistons of the gate valves whose electromagnets are deenergized are returned to normal closed position to block the transmission of the hydraulic punch operating pulse. The restoring hydraulic pulse is delayed to subsequently return the piston associated with an energized magnet back to closed position after the magnet is deenergized. The valve restoring and valve opening hydraulic pulses for said gate valve are preferably supplied by said supplemental valve unit which is operated by cams rotating synchronously with the differential valve unit and the card feeding and punching mechanism.

Other objects of the invention will be pointed out in the following description and claims and illustrated in the accompanying drawings, which disclose, by way of example, the principle of the invention and the best mode, which has been contemplated, of applying that principle.

Hydraulic pressure unit

Figure 1:
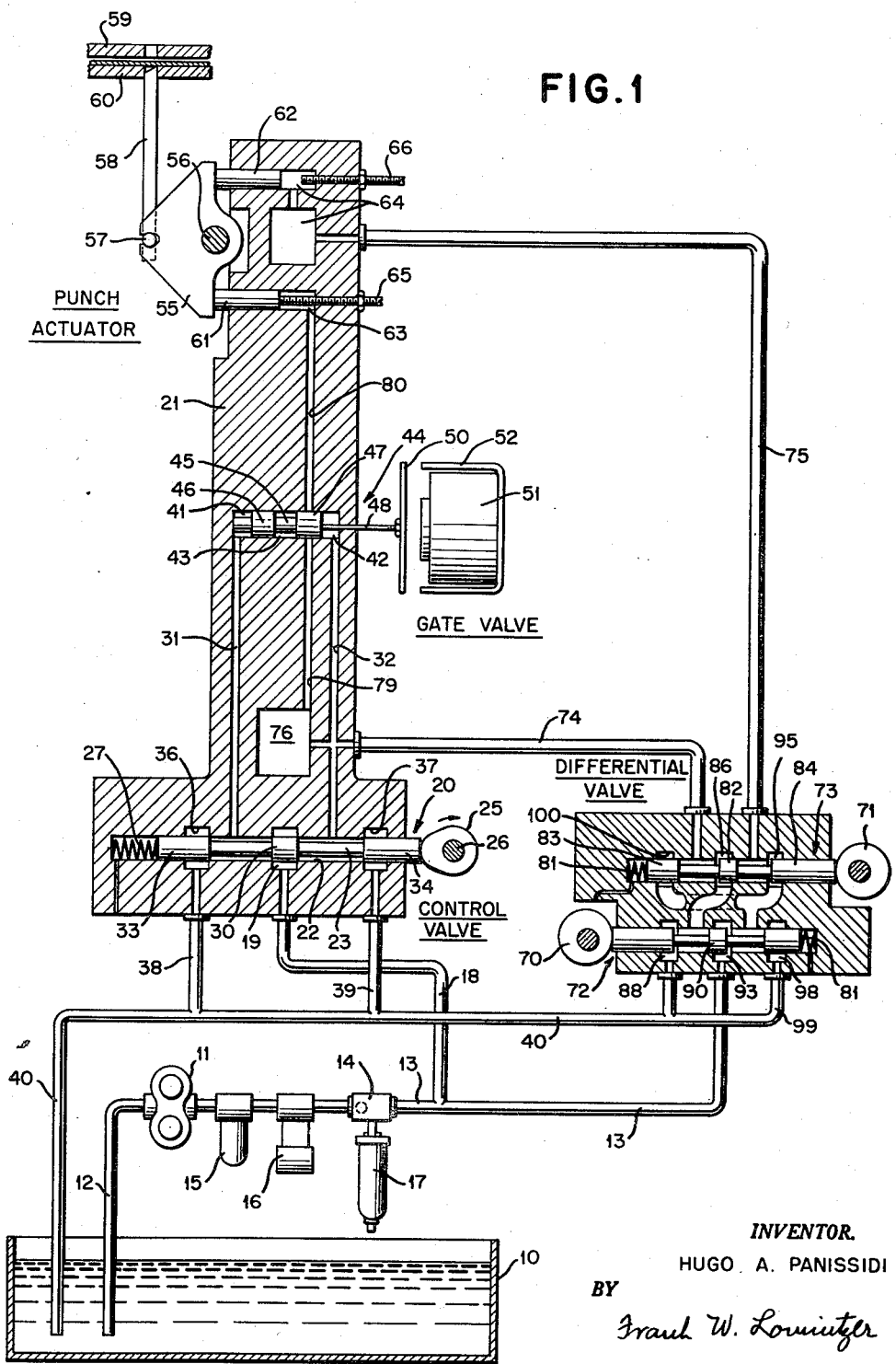
Fig. 1 is a combined view showing diagrammatically and schematically the interconnected components forming the complete hydraulic apparatus constructed according to the present invention.

Referring to Fig. 1 a liquid holding pump or reservoir 10 is the supply of a suitable fluid for a hydraulic pressure generating means which is preferably in the form of a positive displacement gear pump 11. Through a suitable suction pipe 12 the liquid is withdrawn from reservoir 10 by the pump 11 and is delivered under pressure to a liquid pressure duct or conduit system which includes the liquid pressure conduit 13. Between the gear 11 and conduit 13 there is interposed a check valve 14 to prevent back-flow of pressure should the pump stop, a conventional filter 15, and a pressure regulator valve 16 adapted to maintain a substantially constant liquid pressure in conduit 13. An accumulator 17 may also be connected to the conduit 13 to compensate for pressure fluctuations therein.

Control valve

A branch conduit 18 (Fig. 1) of the pressure conduit 13 is connected to a pressure port of a cyclically operated control valve 20 of the spool valve type. This valve is formed by a cylindrical bore in the framework 21 of the punching mechanism to provide a cylinder 22 and includes a shaft 23 carrying lands or pistons to be presently described. The shaft 23 of the control valve is shifted or reciprocated in cylinder 22 under control of an eccentric cam 25 attached to a shaft 26 and rotated in timed relation with other machine elements and performs one complete revolution for each card hole punching. The control valve 20, or more specifically the shaft 23 thereof, is urged to follow the eccentric cam 25 by means of a suitable compression spring 27 fitting in the end of cylinder 22 and bearing against the lefthand end of shaft 23. The control valve includes a central land or piston 30 for alternately directing the flow of pressure liquid from the pressure port 19 to a pair of pressure conduits 31 and 32, and a pair of outer spaced lands or pistons 33 and 34 for forming a communication between each of the conduits 31 and 32 when pressure is applied to the other conduit 31, 32 and respective valve exhaust port 36 and 37. The latter are connected by respective conduits 38 and 39 to a fluid return conduit 40 seated in the interior of the reservoir 10.

Parallel fluid chambers 41, 42 are formed transversely in the punch framework 21, and between chambers 41, 42 a plurality of cylinders 43 is provided, there being as many cylinders 43 as columns of punching are to be supplied. In the present machine since punching is to be effected in eighty columns, a corresponding number of cylinders 43 and gate valves 44 are provided, all or a plurality of which may be actuated by pulses derived from a single control valve 20.

Each of said gate valves 44, which are also of the spool type, includes a shaft 45 carrying a plurality of pistons 46, 47. The design of the gate valve is the unbalanced pressure type, i.e. whenever pressure is applied to the valve regardless whether it is opened or closed, it will seize for the duration of the applied pressure for a reason to be evident soon.

The shaft 45 of each gate valve has a reduced extension rod 48 to which the armature 50 of a punch control magnet 51 is secured. The action of the control valve 20 is to apply hydraulic pressure to all the pistons 46 to initially shift the gate valves to open position and seal all of the armatures 50 against the yokes 52 of their magnets 50, after which each magnet 51 is energized if punching is to be effected at this particular cycle point. This action occurs repeatedly at a rate of 5600 cycles per minute, so that just prior to punching a hole, which is determined by the energization of a magnet 51, the armature 50 is sealed against the yoke 52 of the magnet 51.

Figure 6:
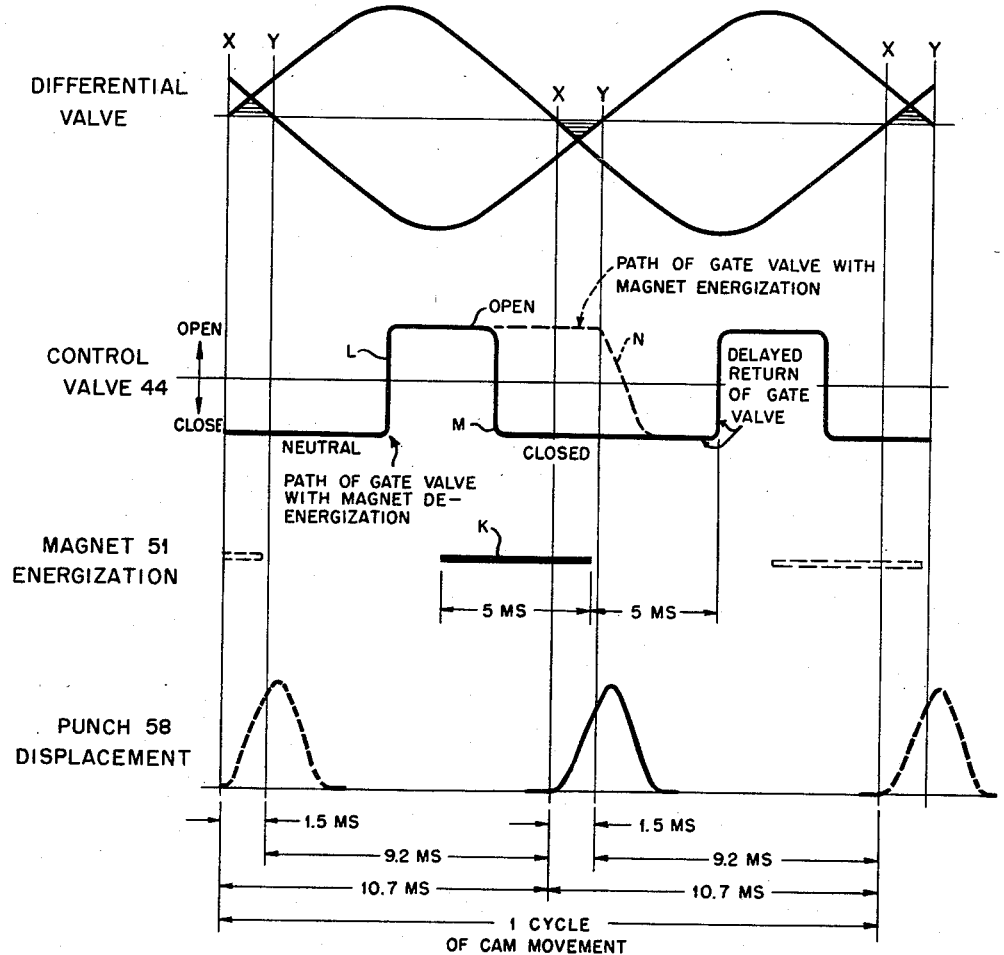
Fig. 6 is a timing diagram illustrating the sequence of events of the hydraulic apparatus shown in Figs. 1–5 and their interrelation with events occurring in the punching mechanism.

Referring now to Fig. 1 and the timing diagram of Fig. 6, the above action and operation are effected by movement of piston shaft 23 from a neutral position under control of cam 25, first to the right which positions piston 30 to provide a communication between pressure chamber 19 and conduit 31, which it will be seen terminates in the chamber 41. This provides fluid pressure in chamber 41 and upon each of the pistons 46 to shift all armatures 50 against their respective yokes 52 of magnets 51, in which position each gate valve is open and is retained open if the related magnet 51 is then energized. As piston 34 of the control valve 20 moves to the right under control of cam 25 said piston 34 provides a communication between the exhaust chamber 37 to which the conduit 32 and return conduit 39 are connected. This provides a return of fluid in chamber 42 and conduit 32, which fluid then returns by conduits 39 and 40 to the reservoir 10.

After valve shaft 23 has been moved by spring 27 to the right under control of cam 25, said cam returns valve shaft 23 to the left and at its extreme lefthand position piston 30 is so positioned that it provides a communication between pressure chamber 19 and conduit 32, whereby fluid pressure is now applied to the pressure chamber 42 and to the pistons 47 of all gate valves, thus shifting the valve shafts 45 of all those gate valves back to closed position shown in Fig. 1 whose magnets 51 are not energized at this time. The path of the gate valve to closed position with magnet deenergization is shown in Fig. 6. During this operation the piston 33 of the control valve is now positioned so that it provides a communication between chamber 41, conduit 31 and exhaust chamber 36, enabling free return of the liquid to the reservoir 10 by return conduits 38 and 40.

The magnets 51 which are energized during this operation overcome the hydraulic pressure applied to the pistons 47 of the gate valves and retain the gate valves open. When any gate valve is open the piston 47 is in such position that it permits a hydraulic work pulse to be applied to a hydraulic punch motor, as will soon be described. It is evident then that if an electrical impulse is applied to the magnet at the time when the magnet armature 50 and yoke 52 are mechanically sealed, the return stroke of the gate valve will be delayed sufficiently to permit the hydraulic pulse from the differential valve to actuate the punch pistons 61. Referring to Fig. 6 timing chart, it will be noted that the gate valve is delayed or urged to the left during a period of 5 milliseconds after the electromagnet is deenergized.

It will be evident then that the magnets 51 accomplish no work in actually opening and closing the respective gate valves 44, since this is effected by alternating hydraulic pressure pulses derived from control valve 20. The magnets 51 merely determine whether the gate valves are to be immediately restored to their normal closed position, or are to be retained in their open position to enable the hydraulic work pulse to be applied to the punch motors or actuators.

Punch actuator

The punch actuator preferably comprises for each order a rockable plate 55 pivoted on a rod 56 carried by the punch framework. Plate 55 has an open slot receiving a pin 57 of a punch pin 58 adapted when elevated to pass through a hole in a die plate 59 and a stripper plate 60 to punch a hole in the selected index position of the card column.

Loosely fitting in valve cylinders in the punch framework is a pair of pistons 61, 62, the outer ends of which pistons 61, 62 bear against the lower and upper ends of the rockable plate 55. The inner ends of said pistons 61, 62 are subjected to alternate hydraulic pressure pulses from respective pressure chambers 63, 64, as will be presently described.

It is desirable to limit the stroke of the punch actuator 55 in both directions of travel, therefore, a pair of adjustable stop members 65, 66 carried by the punch framework is provided and abut the inner ends of pistons 61, 62 respectively. As shown in Fig. 1, the operating punch piston 61 is normally held against the lower stop 63 by the liquid pressure applied from the pressure restoring chamber 64.

Differential valves

Any suitable hydraulic pulse means for rocking the punch actuators 55 may be provided. However, a hydraulic valve mechanism shown in Figs. 1-5 is preferred. Fig. 6 shows its timing diagram. As shown in Figs. 1-5 a pair of synchronized eccentric cams 70 and 71 provided with the proper phase angle difference, individually operate related control valves 72 and 73 in a predetermined manner to convert fluid supplied by the constant pressure conduit 13 to pulses applied alternately to conduits 74 and 75. This cyclic operation is timed synchronously with the gate valve 44, the control valve 20, the energization of magnets 51 and other timed elements. The hydraulic mechanism referred to above and which will be described herein in a general manner is fully described and claimed in the application of Hugo A. Panissidi, Serial No. 479,111, filed December 31, 1954; now Patent No. 2,800,885, issued July 30, 1957.

From Fig. 1 it will be seen that extending from the upper valve 72 are the conduits 74 and 75. Conduit 74 terminates at one end as a connection to a transverse chamber 76 in the punch framework 21. From chamber 76 there is a plurality of aligned bores 79, 80, one for each punch actuator 55, said bores being normally cut off from each other by the piston 47 of the gate valve in its closed position, as shown in Fig. 1, or having a fluid communication with each other when piston 47 has been shifted to its open position, as has been described. With this construction when gate valve 44 is open, hydraulic pressure is carried from bore 79 to bore 80 and applied to the pressure chamber 63. The applied hydraulic work pulse will shift piston 61 and rock punch actuator 55 clockwise to elevate punch pin 58 to punch a hole in a well known manner. At this time valves 72, 73 are in such position that a return from conduit 75 is made to return conduit 40. Valves 72 and 73 then generate a hydraulic pulse over conduit 75 which is connected to pressure chamber 64 and places pressure on said chamber 64 and piston 62, thus restoring punch actuator 55 and punch 58, if the latter has been previously actuated to punch a hole. At this time piston 47 of the gate valve is in such position that a liquid return may be effected from chamber 63, bores 80, 79, conduit 74, and through valves 72, 73 to return conduit 40.

As has been described, in order to cyclically reciprocate the control valves 72 and 73 to convert liquid under constant pressure to pulses to be directed to the punch operating chamber 63 and punch restoring chamber 64, respectively the pair of shaft-driven rotatable eccentric cams 70 and 71, respectively are provided for said control valves. These eccentric cams engage piston rods of their related control valves 72 and 73, and are effective to alternately reciprocate the control valves in a predetermined manner dependent upon the eccentric formation of said cams. Disposed on the opposite side of the piston rod of each control valve is a suitable compression spring 81 (see Fig. 1) to continuously urge the piston rods against the related cams to follow the same. The cams 70 and 71 may be mechanically driven by any suitable means for synchronous rotation.

For a better understanding of the operation, Figs. 2 to 5 show the various extreme positions of the control valves 72 and 73 during certain portions of their cyclic operation.

Figure 2:
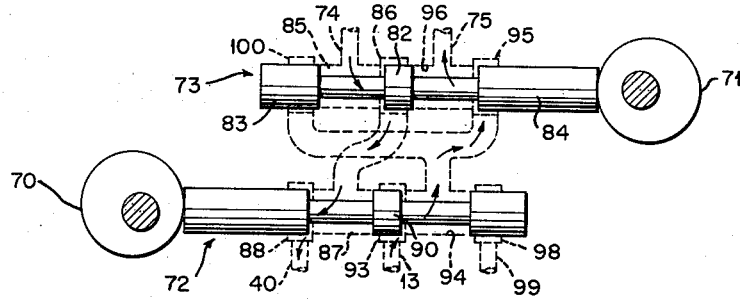
Figs. 2–5 represent, on a larger scale than Fig. 1, successive positions of the hydraulic differential valves during a complete cycle of operation.

As shown in Fig. 2, the second control valve 73, having followed its cam 71, is at the right to position the central control piston 82 and end pistons 83 and 84 for enabling the punch operating pressure chamber 63, bores 80, 79, pressure chamber 76 (Fig. 1) to drain by means of the conduit 74, chamber 85, the open central port 86 which leads to the chamber 87 in the first control valve 72, the drain port 88, and return conduit 40. At this time the pistons 47 of the gate valves (Fig. 1) are at the left to enable communication between bores 79 and 80.

With the second control valve 73 in the position shown in Fig. 2 the eccentric cam 70 has earlier permitted the first control valve 72 to shift to the position shown in Fig. 2 wherein its central piston 90 is at the left. In this position, the pressure port 93 connected to pressure duct 13 directs liquid under pressure to the right through the chamber 94 and channel leading to the now open righthand port 95 of the second control valve 73, which in turn directs the liquid through the associated chamber 96 and conduit 75 to the restoring drive chamber 64 of the punch restoring pistons 62. Thus, it can be seen that during the conditions above described, the operating piston 61 and thus the punch actuator 55 are maintained in their retracted positions by the liquid under pressure and that the conduit 74 is directly connected to drain through the open exhaust port 88. The above positions of the valves 72 and 73 represent the dwell time interval indicated from Y—X in the timing chart during the first and second half cycles of cam rotation.

Figure 3:
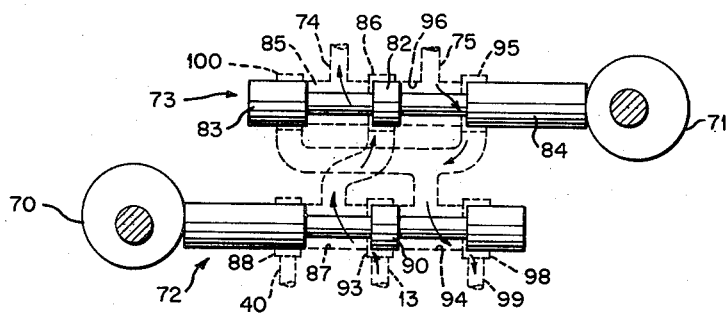

As the eccentric cams rotate in synchronism, with the second cam 71 lagging the first cam 70 by a phase angle difference of 40°, the point is reached wherein the first cam 70 shifts the first control valve 72 to the right, as shown in Fig. 3. As its shifting central control piston 90 reaches the point X, Fig. 6, the liquid under pressure is transferred or redirected at the pressure port 93 to the lefthand chamber 87 which communicates with the central control port 86 of the second valve 73. Since valve 73 has not changed in Fig. 3 its position from that shown in Fig. 2 the liquid passes through the chamber 85 and over the conduit 74 to the pressure chamber 76, thence by bores 79, 80, and open gate valve 44 to pressure chamber 63. This is effective in the event that a gate valve has been retained opened by energization of its magnet 51 to drive the punch piston 61 rapidly to the left, following the curve E of Fig. 6 to perform the punching operation. Of course, as the first control valve 72 shifts to the right, the righthand exhaust port 98 is opened (see Fig. 3) to enable the displaced liquid in the chambers 64 to drain through conduit 75, port 95, the channel to chamber 94, port 98, branch drain conduit 99, to drain conduit 40, as shown by the arrows in Fig. 3.

Figure 4:
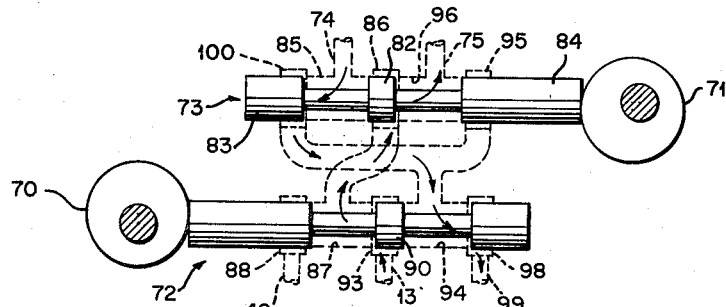

Approximately 1.5 milliseconds after the first control valve 72 shifts to the right and passes over its cutoff or neutral position, represented as the time period X—Y on the timing chart, the cam 71 shifts the second control valve 73 to the left or in the opposite direction so that the central piston 82 cuts off the supply of liquid to the operating chamber 76 at the point Y, shown in the timing chart. Further travel to the left redirects the liquid under pressure supplied to the port 86 through the chamber 96 and the retraction conduit 75 to the retraction chamber 64. This quickly returns the punch piston 61 against its stop 65 in the retracted position. The shifting action of the second control valve 73, of course, cuts off the righthand port 95 to prevent discharge to drain and at the same time connects the operating piston chamber 76 and conduit 74 to the lefthand port 100 which is now connected to drain through the passage leading to the righthand exhaust port 98 of the first control valve 73, as shown by the arrows. With the pistons as shown in Fig. 4, it is obvious the punch will be held retracted in the same way as effected by the valve position in Fig. 2, but the control pistons of both valves have been transferred to the opposite sides of their pressure ports. This represents the completion of a half cycle of cam and valve movement.

Figure 5:
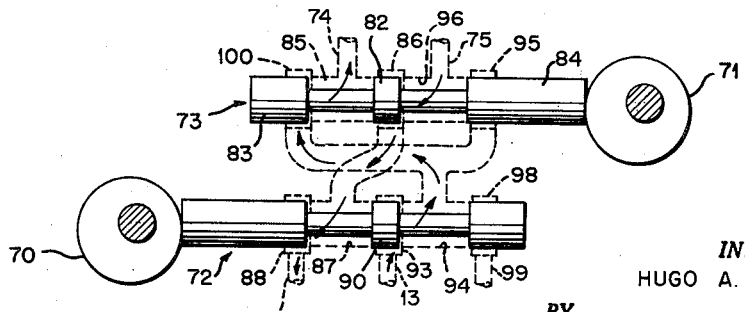

As the cams continue their rotation, the second control valve 73 is maintained with the righthand side of the port 86 open, however, the first control valve 72 now shifts to the left, as shown in Fig. 5. After its cutoff position is reached at the point X, continued travel opens the righthand side of the pressure port 93. Thus, liquid under pressure is redirected to the right chamber 94, passes through the channel leading to the now open lefthand port 100 of the second control valve 73, continues through the chamber 85 and conduit 74 and is applied at the pressure operating chamber 76 to again shift the punch piston 61 to the left. Upon punch piston movement to the left, the liquid in the retraction chamber 64 is displaced, passes through the return conduit 75, chamber 96, the central port 86 of the second valve 73, the channel leading to the chamber 87 in the first valve 72 and the lefthand exhaust port 88 to drain, as clearly shown by the arrows in Fig. 5.

After the punch piston 61 has performed the punching operation, the second control valve 73, lagging the first valve 72, now shifts to the right back to the Fig. 2 position and at the point Y, its end piston 83 (see Fig. 2) acts to cut off the supply of high pressure liquid previously directed in the Fig. 5 position at the lefthand port 100. This action also connects the operating chamber 63 and chamber 76 to drain through the conduit 75, the central port 86, the connection to the lefthand exhaust port 88 in the first control valve 72, to the drain conduit 40. As this occurs, of course, the righthand port 95 of the second control valve 73 is opened which immediately applies liquid under pressure to the retraction chamber 64, as indicated by the arrows in Fig. 2 to return the punch to its normal position. Thus, the valves have now completed a full cycle as indicated on the timing diagram, Fig. 6. This end of a full cycle position corresponds to the differential valves' positions shown in Fig. 2 and further valve operations from this point would be repeated in a cyclical manner.

In this particular embodiment, the eccentric cams 70 and 71 are rotated synchronously with operations of the punch selecting mechanism including the time of energization of magnet 51. The hydraulic pressure impulses directed from the differential valves to the punch piston 61 occur twice for each complete revolution of the eccentric cams 70 and 71. This timing is exactly in agreement with two operations of the punch selecting mechanism. This is shown in the timing chart of Fig. 6 wherein each hydraulic pulse transmission is timed to occur immediately after each magnet energization. Of course, if the punch selection is set up at a high or lower rate, the speed of operation of the eccentric cams would be varied accordingly.

Any suitable gear reduction arrangement (not shown) may be provided to positively drive the valve cams 70 and 71 in synchronism with the punch selecting mechanism.

From Fig. 6 it will be observed that during the Y—X period of each half cycle while the punch actuators 55 are being restored the control valve 44 first transmits a hydraulic pressure pulse in the duct or conduit 31 and pressure chamber 41 to drive the gate valves open and to seal the armatures 50 against the yokes of their magnets 51. This operation (timing L) ensues just prior to the transmission of the electrical pulse K to energize magnet 51. The control valve then reverses (timing M) to apply hydraulic pressure in duct 32 after such energization to restore the gate valves for those orders in which the magnets 51 are unenergized. The retention of each gate valve, when a magnet is energized, is shown by the dotted line timing N, whereas, for the unenergized magnets the gate valves return, as shown by the full line timing M. It will also be observed that during each hydraulic pulse period X—Y, the gate valves are retained opened, and the magnets 51 are still energized, as shown by the 5 millisecond time of energization of the magnet 51. The time of the reciprocation of the punch (timing E) is synchronized with the hydraulic pulse period X—Y in each half cycle, thus, conforming to the requirement that a magnet 51 effectively retains its related gate valve closed at the time control valves 72, 73 transmit a hydraulic punch operating pulse to effect, in the same hydraulic pulse period, the punch displacement.

*Card punching machine*

Figure 7:
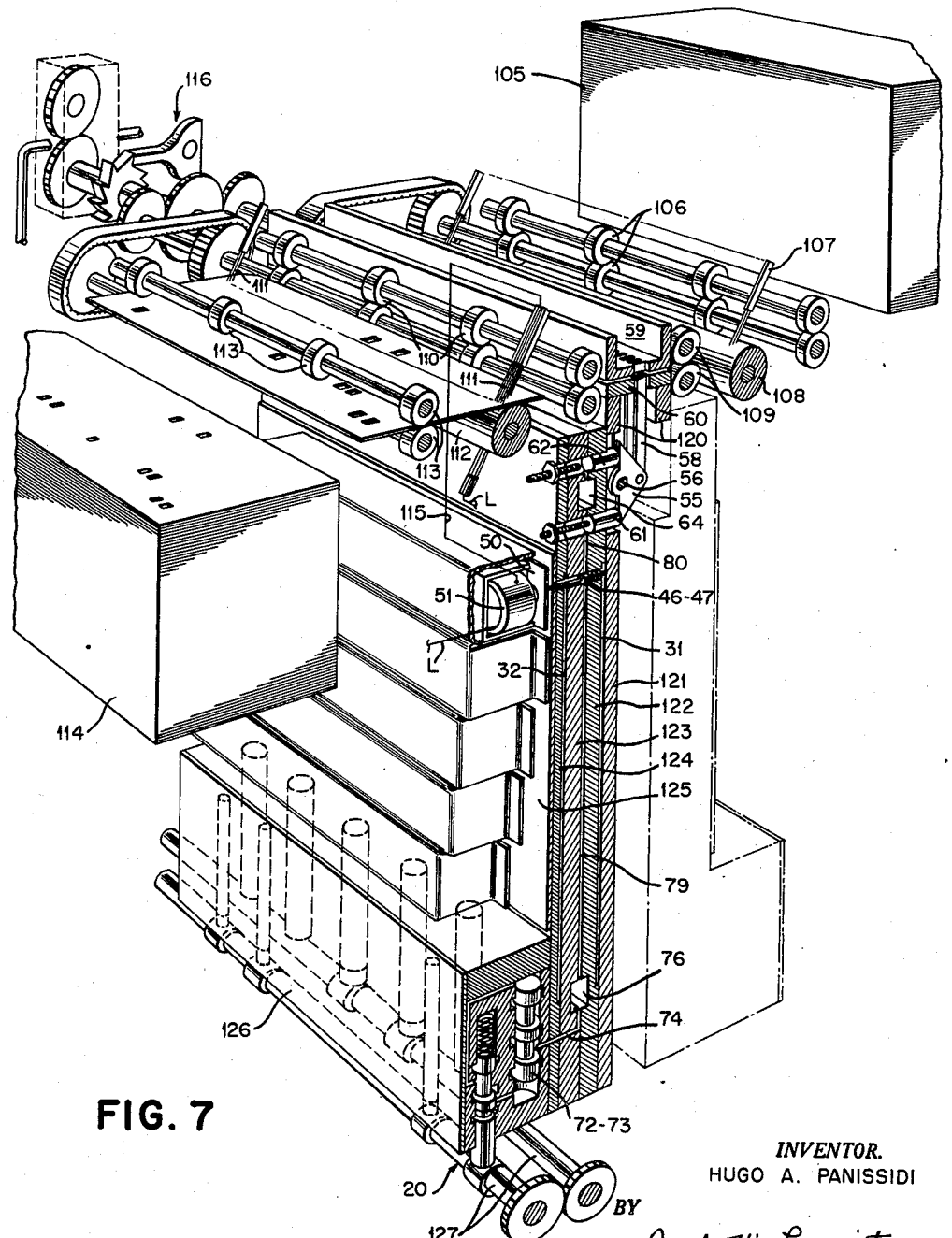
Fig. 7 is a perspective view which shows one possible mechanical construction of the present hydraulic apparatus when incorporated in a well known type of punching machine.

The present improvements may be embodied with advantage in a card punching machine of the type shown in Fig. 7 which is well known and disclosed in numerous patents, among which the patent to C. D. Lake, No. 2,032,805 may be referred to. Fig. 7 also discloses how the preferred construction of the hydraulic punch operator and electromagnetic control therefor is designed in such manner that it fits in the above type of card punching machine.

The above form of punching machine comprises a "read side" and a "punch side." Only the latter is generally shown in Fig. 7 to understand by way of example how the electromagnetic control of the hydraulic punch operator by read brushes for pattern cards enables their duplication on blank cards by the improved hydraulic punch operator at an increased speed.

The stack of cards 105, which are abviously in a hopper, comprise for each group a pattern card and a following of blank cards which are fed by a card picker to feed rolls 106, and then to a reading station comprising "X" sensing brushes 107 and a contact roller 108, neither of which specifically enters in the present improvement. The cards are then fed by a pair of rollers 109 to the punching mechanism. The punched cards are thereafter engaged and fed by rollers 110 to a pattern read station comprising brushes 111 and a contact roller 112. The punched cards are then fed by feed rollers 113 to a storage hopper, reference character 114 representing a stack of punched cards which would be fed therein.

As is well known, holes in the pattern card are analyzed by brushes 111, closing a circuit diagrammatically shown for one order as from line L, contact roller 112, through brush 111, wire 115, magnet 51 to line L. When a brush 111 senses a hole in an index point of a pattern card the corresponding index point of a following blank card is beneath the punch 58, and as a result of the energization of the magnet 51 and the operation of the hydraulic punch operator the blank card is punched at a high speed. After the first blank card has been punched it acts as a pattern card for the following blank card of the group, as is well known in this form of card punching machine.

The card punching machine shown in the aforesaid patent to Lake, No. 2,032,805 employs a mechanical Geneva drive for the card feed rolls to effect a step by step in operation. It is well adapted for lower punch speeds but for the present machine to obtain the full advantage of the higher punch speeds obtainable by the present improvement, it is desirable to employ an intermittent or step by step hydraulic feed roll drive. The latter is generally shown herein and identified by reference numeral 116. Details of this form of intermittent hydraulic drive are shown and claimed in the application of H. A. Panissidi, Serial No. 661,113, filed May 23, 1957 now Patent No. 2,902,005.

Referring to Fig. 7 the stripper plate 59 consists of a transverse channel member and the cooperating punch die 60 consists of a plate supported by transverse plates 120. Below said punching mechanism there is provided a dual set of sandwiched assembled plates, designed with a view of providing the necessary conduits by channeling the face of the plates, and the necessary hydraulic pressure chambers by transverse milled slots, as will soon be evident. For each side there is a series of plates 121—125.

Transverse chamber 64 is formed by milling or channeling plates 122, 123. Pistons 61, 62 are also slidable in said plates 122, 123. Magnets 51 are carried by the outer cover plate 125, the five assemblies of eight magnets being assembled on one side and another similar assembly being assembled on the other side, thus enabling the eighty magnets for 80 rows to be widely spaced, and the punches close together for narrow column punching. Fig. 7 also shows clearly the formation of the plates 122, 123, 124 to provide cylinders for the gate valves 46, 47, and related conduits 31, 32, 79, 80 and pressure chamber 76, which latter has the duct connection 74 to the differential valves 72—73. The series of differential and control valves are assembled in a liquid tight chamber 126, and are driven by intergeared parallel shafts 127. The hydraulic power supply, reservoir, etc. are not shown in Fig. 7 since they are a unit assembled apart from the punching unit, and having only conduit connections thereto, as clearly shown in Fig. 1.

While there have been shown and described and pointed out the fundamental novel features of the invention, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A hydraulic apparatus for selectively controlling the period of transmission of fluid under pressure to operate a work member during one period and restoring it during a longer period comprising hydraulically operated means for operating and restoring said work member, a first valve having fluid conducting passages communicating with fluid under pressure, a second valve having fluid conducting passages, means interconnecting the fluid passages of the first valve with the fluid passages of the second valve, means for operating said first and second valves in timed sequence with a predetermined difference in phase to convert said fluid under pressure to a first pulse derived from said second valve consuming one period and a second pulse consuming a longer period, means connecting said second valve to said hydraulically operated means, a gate valve for selectively controlling the transmission of said first pulse to said hydraulically operated means and having an open position and a closed position, hydraulic means for shifting by successive fluid pressure pulses to opposite sides of said gate valve to open and close said gate valve prior to transmission of said first pulse, and means comprising an electromagnet energized when said first pulse is to be transmitted to restrain said gate valve from being shifted to said closed position.

2. A hydraulic apparatus for selectively controlling the transmission of fluid under pressure to operate a work member comprising hydraulically operated means for operating said work member, a first valve having fluid conducting passages communicating with fluid under constant pressure, a second valve having fluid conducting passages, means interconnecting the fluid passages of the first valve with the fluid passages of the second valve, means for operating said first and second valves in timed sequence to convert said fluid under constant pressure to a pulse derived from said second valve, means connecting said second valve to said hydraulically operated means for transmission of said pulse to said hydraulically operated means, a gate valve for selectively controlling the transmission of said pulse and having an open and closed position, supplemental hydraulic valve means for applying successive fluid pressure pulses to said gate valve to successively open and close said gate valve prior to transmission of said pulse, and means comprising an electromagnet energized when said pulse is to be transmitted to restrain said gate valve from being shifted to the closed position.

3. A hydraulic apparatus for operating a work member, hydraulic means responsive to successive timed operating and restoring pulses for respectively operating and restoring said work member, comprising hydraulic pulse generating means for converting liquid under constant pressure to said timed operating and restoring hydraulic pulses, means connecting said pulse generating means to said hydraulic means for applying said operating and restoring hydraulic pulses to successively operate and restore said member, a gate valve for selectively controlling the transmission of said operating hydraulic pulse to said hydraulic means and having an open position and a closed position, further hydraulic pulse generating means for successively transmitting pulses to opposite sides of said gate valve for moving said gate valve to open position and closed position during the transmission of said second restoring pulse and prior to the transmission of said operating hydraulic pulse, and means controlled by an electromagnet energized prior to the movement of said gate valve to said open position to hold the gate valve and retain it in its open position for effecting the transmission of said operating hydraulic pulse to said hydraulic means.

4. A hydraulic apparatus for selectively controlling the transmission of a work pulse comprising hydraulic means responsive to said work pulse, a piston gate valve within a cylindrical bore and having a closed position to prevent the transmission of said work pulse and an open position to effect the transmission of said work pulse, means for applying hydraulic pulses alternately to opposite sides of said piston gate valve to move said valve from a closed position to an open position and then back to a closed position, an electromagnet, an armature of said magnet connected outside of said cylindrical bore to said piston, and means for energizing said magnet when said valve is in said open position to magnetically attract said armature with a magnetic force overcoming the force of the hydraulic pulse which would close said gate valve, whereby said gate valve is retained open.

5. A hydraulic apparatus for selectively controlling the transmission of a work pulse over a conduit, a piston within a cylindrical bore adapted in one position to open said conduit and in another position to close said conduit, valve means for producing successive hydraulic pulses, means controlled by said valve means to apply said pulses alternately to opposite sides of said piston to move said piston from a conduit closing position to a conduit opening position and then back to a conduit closing position, an electromagnet, an armature of said magnet connected to said piston, and means for energizing said magnet when said piston is in conduit opening position to magnetically attract said armature with a magnetic force overcoming the force of the hydraulic pulse which would move said piston to a conduit closing position, whereby said piston is retained in a conduit opening position.

6. A hydraulic apparatus for selectively controlling the transmission of a work pulse comprising a piston freely floating within a cylindrical bore, means for directing successive hydraulic pulses to opposite sides of said piston to move said piston from a work pulse blocking position to a work pulse directing position and then back to a work pulse blocking position, and electromagnetic means operable when said piston is in a work pulse directing position to magnetically attract said piston with a magnetic force overcoming the force of the hydraulic pulse which would move said piston to a work pulse blocking position, whereby said piston is retained in work pulse directing position.

7. A hydraulic apparatus for selectively controlling the transmission of work pulses comprising a plurality of pistons, each freely floating within a related cylindrical bore, common valve means for directing successive hydraulic pulses to opposite sides of each of said pistons to move said plurality of pistons from a work pulse blocking position to a work pulse directing position and then back to a work pulse blocking position, and a plurality of electromagnetic means, one for each piston and each operable when the related piston is in a work pulse directing position to magnetically attract said related piston with a magnetic force overcoming the force of the hydraulic pulse which would move said related piston to a work pulse blocking position, whereby said piston is retained in work pulse directing position.

8. A hydraulic apparatus for selectively controlling the transmission of a work pulse over a conduit comprising a piston within a cylindrical bore having a conduit opening position and a conduit closing position, means for producing successive hydraulic pulses, means controlled by said hydraulic pulse producing means to apply said pulses alternately to opposite sides of said piston to move said piston from one of said positions to the other of said positions and then back to said one position, magnetic means, and means controlled by said magnetic means to retain said piston in said one position by a magnetic force overcoming the force of the hydraulic pulse which would move said piston to the other position, whereby said piston is retained in said one position.

9. A hydraulic apparatus for selectively controlling the transmission of a work pulse comprising a piston within a cylindrical bore and having a work pulse blocking position and a work pulse directing position, means for directing successive hydraulic pulses to opposite sides of said piston, one of which moves said piston from one of said positions to the other of said positions, and electromagnetic means operable when said piston is in said one position to magnetically attract said piston with a magnetic force overcoming the force of the hydraulic pulse which would move said piston to said other position, whereby said piston is retained in said one position.

References Cited in the file of this patent
UNITED STATES PATENTS

| | | |
|---|---|---|
| 1,978,966 | Sprague | Oct. 30, 1934 |
| 2,470,566 | MacConnell | May 17, 1949 |
| 2,633,197 | Nischan | Mar. 31, 1953 |
| 2,800,885 | Panissidi | July 30, 1957 |
| 2,816,608 | Farmwald et al. | Dec. 17, 1957 |